Jan. 19, 1926.

C. D. DILLEY 1,570,339

DOUGH MOLDING MACHINE

Filed Sept. 19, 1925    2 Sheets-Sheet 1

Inventor:
Charles Dawson Dilley
Per:-
Rayner & Co
Attorneys.

Jan. 19, 1926.                                          1,570,339
C. D. DILLEY
DOUGH MOLDING MACHINE
Filed Sept. 19, 1925          2 Sheets-Sheet 2

Inventor.
Charles Dawson Dilley.
Per:- Rayner & Co
Attorneys.

Patented Jan. 19, 1926.

1,570,339

UNITED STATES PATENT OFFICE.

CHARLES DAWSON DILLEY, OF PLYMOUTH, ENGLAND.

DOUGH-MOLDING MACHINE.

Application filed September 19, 1925. Serial No. 57,400.

*To all whom it may concern:*

Be it known that I, CHARLES DAWSON DILLEY, a subject of the King of Great Britain and Ireland, residing at Plymouth, Devonshire, England, have invented a new and useful Dough-Molding Machine, of which the following is a specification.

This invention relates to apparatus for molding dough or for like purposes and has for its object to provide an improved apparatus which will shape or mold dough in an easy and efficient manner without deteriorating it.

Broadly an apparatus for the purpose set forth according to my invention comprises a rotatable table above which is disposed a substantially annular former which is adapted to be oscillated in such a manner that the rotation of the table and the movement of the former causes the dough to travel along the former and molds the dough and delivers it from the former.

In carrying my invention into practice, the former comprises a substantially annular arcuate section chamber disposed slightly above the table and eccentrically thereto, the continuity of the chamber being interrupted for a relatively short distance to provide one end for feeding the dough therein and another end for delivering the molded dough therefrom. Adjacent this delivery end suitable means is provided for guiding the discharged dough into the requisite direction or a suitable receptacle.

The rotating table is preferably rotated by means of a friction drive the speed of which is adjustable and the former is rotated eccentrically by means of a number of uniformly rotating members of relatively short radius, connected to the former by arms radiating a short distance from the periphery of the former. Owing to the shape of the former and the rotary movement of the table, the oscillating movement of the former gives long and short sweeps or thrusts alternately and this movement has a much better effect on the dough than would a succession of equal sweeps or thrusts.

In order that my invention may be clearly understood and readily carried into effect, I have appended hereto two sheets of drawings illustrating an embodiment of same, wherein:—

Figure 1:
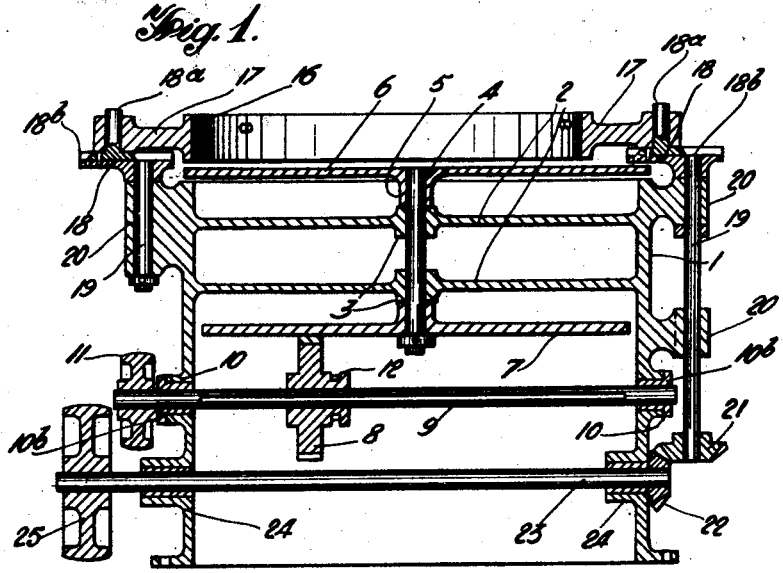
Figure 2:
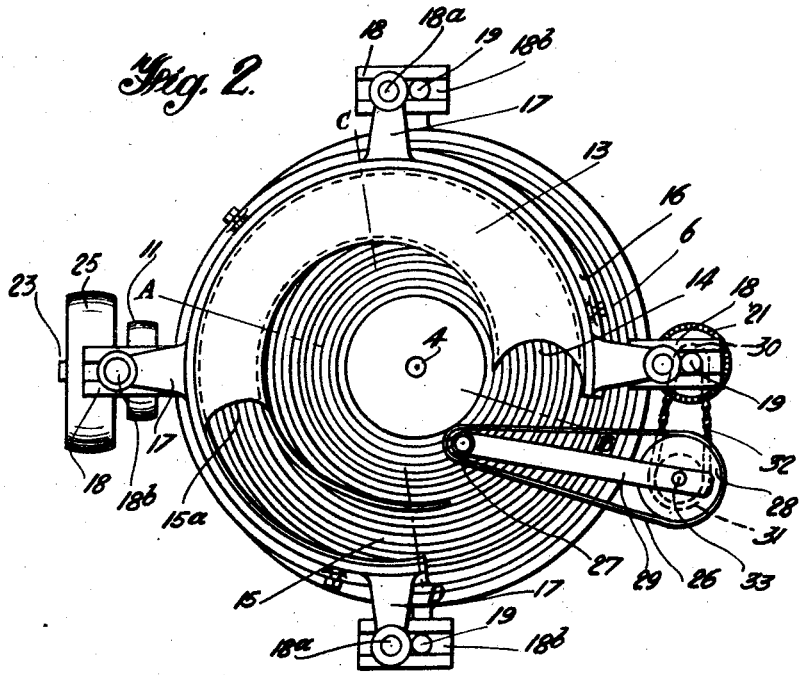
Figure 3:
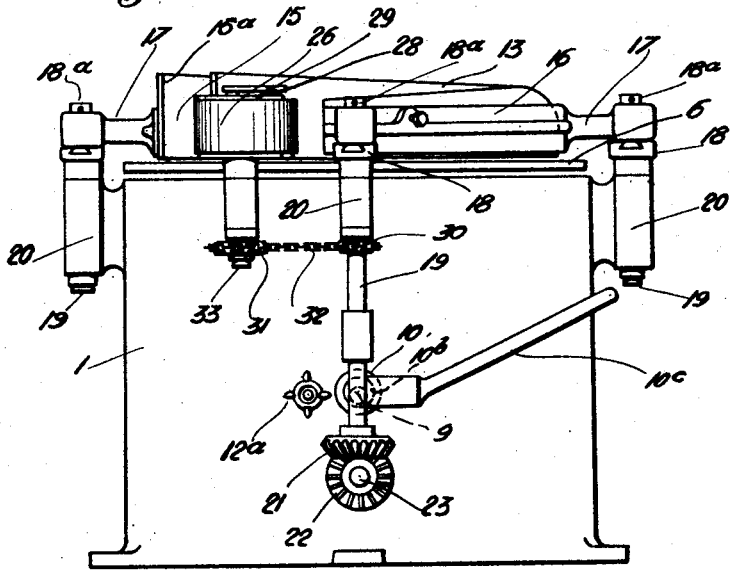
Figure 4:
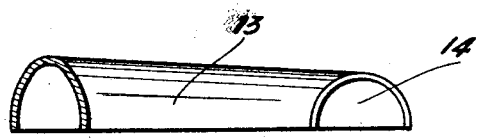
Figure 5:
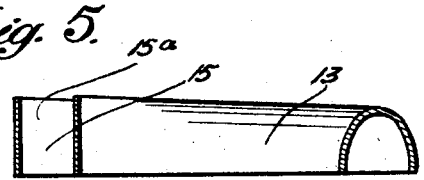

Fig. 1 is a vertical sectional elevation.
Fig. 2 is a plan view.
Fig. 3 is an end elevation.
Fig. 4 is a section on the line A—B of the former, and
Fig. 5 is a section on the line C—D of the former.

Referring to the drawings the machine comprises a frame 1 provided with internal webs 2 the centres of which are formed with bosses 3 to carry bearings for a vertical axially rotatable shaft 4 secured into the hub 5 of a circular table 6 upon the annularly ribbed upper surface of which is adapted to be placed the dough. The shaft 4 and table 6 are rotated by means of a friction drive comprising a friction disc 7 secured to the lower end of the shaft and a friction wheel 8 engaging with the under surface of the disc 7. The wheel 8 is carried slidably upon a horizontal shaft 9 supported in bearings 10 in the frame 1, a pulley 11 being provided for receiving a belt for transmitting rotary movement from a suitable prime mover. Variations in the speed of rotation of the table 6 can be readily obtained by sliding the friction wheel 8 along the shaft 9 by means of a fork 12 mounted on a screw-threaded rod (not shown) and adapted to be rotated by a hand wheel 12ª (Fig. 3). The bearings 10 of the driving shaft 9 are fitted with eccentric sleeves 10ᵇ and are coupled together by the lever arm 10ᶜ so that by depressing the latter the friction drive may be disengaged when desired.

Supported slightly above but substantially parallel to the table 6 is the former 13 which is in the form of an annular arcuate section channel having a portion removed, or its continuity interrupted so as to provide an inlet 14 and a discharge point 15. The discharge end of the former is open at the top, as at 15ª, so that no top pressure is applied to the dough as it is delivered.

The former 13 is carried concentrically within a curved frame 16 having radiating arms 17 whereby it is connected to a number of cranks 18 carried by rotating vertical spindles 19 supported in bearings 20 carried by the frame 1. One of these spindles 19 is prolonged downwards and carries at its lower end a bevel pinion 21 meshing with a bevel pinion 22 carried at one end of a horizontal shaft 23 supported in bearings 24 in the frame 1, one end of this shaft having a pulley 25 for receiving rotary movement.

The former 13 is supported in eccentric relation to the table 6 and it is moved bodily in a small radius path relatively of the table which is determined by the rotation of the cranks 18. The throw of these cranks 18 is adjustable by sliding the crank pins 18ᵃ in the crank arms 18ᵇ. Any number of different shapes and sizes of former 13 may be interchangeable in the supporting frame 16.

In order to guide the molded dough into a desired direction, a rotating endless band 26 is disposed across one side of the table 6 adjacent the discharge end of the former 13, so that the molded dough as it leaves the former is carried by the rotating table against the endless band, and the endless band directs the dough off the table. This band 26 is guided around pulleys 27 and 28 connected by horizontal arms 29 which pivot about the axis of the pulley 28 so that the relative positions of the discharge end of the former 13 and the band 26 can be adjusted. A pair of sprockets 30 and 31 having an endless chain 32 around them transmit rotation from the elongated spindle 19 to the spindle 33 of the pulley 28.

In operation the dough is fed by hand or any suitable feeding mechanism onto the table 6 so as to be carried into the inlet end of the former 13. The dough owing to its continued engagement with the rotating table and owing to the motion of the former being molded in the former and carried round to the point of delivery, where it is taken up by the travelling band 26 and delivered on to any convenient receptacle.

In order to facilitate the molding to the desired formation of the dough, the former 13 is made of a gradually changing cross section from the inlet end to the delivery end, the inlet end being wider but shallower than the discharge end. This will be clear by reference to Figs. 4 and 5.

I claim:—

1. In a dough molding machine, a rotatable table, a substantially annular former supported over the table and means for moving the former transversely to the axis of the table so that the rotation of the table and movements of the former will cause the dough to travel along the former and to be molded and delivered therefrom.

2. In a dough molding machine, a rotatable table, a substantially annular former supported over the table and means for imparting an oscillating movement to the former transversely to the axis of the table so that the rotation of the table and movement of the former will cause the dough to travel along the former and to be molded and delivered therefrom.

3. In a dough molding machine, a rotatable table, a substantially annular former supported over the table and means for imparting an eccentric oscillating movement to the former transversely to the axis of the table so that the rotation of the table and movement of the former will cause the dough to travel along the former and to be molded and delivered therefrom.

4. In a dough molding machine, a rotatable table, a substantially annular former supported over the table, means for moving the former transversely to the axis of the table so that the rotation of the table and movement of the former will cause the dough to travel along the former and to be molded and delivered therefrom, and means for varying the relative rate of movement of the table and former.

5. In a dough molding machine, a rotatable table, a substantially annular former supported over the table, means for imparting an oscillating movement to the former transversely to the axis of the table so that the rotation of the table and movement of the former will cause the dough to travel along the former and to be molded and delivered therefrom, and means for varying the relative rate of movement of the table and former.

6. In a dough molding machine, a rotatable table, a substantially annular former supported over the table, means for imparting an eccentric oscillating movement to the former transversely to the axis of the table so that the rotation of the table and movement of the former will cause the dough to travel along the former and to be molded and delivered therefrom, and means for varying the relative rate of movement of the table and former.

7. In a dough molding machine, a rotatable table, a substantially annular former supported over the table, and a series of rotatable cranks for imparting an eccentric oscillating movement to the former transversely to the axis of the table so that the rotation of the table and movement of the former will cause the dough to travel along the former and to be molded and delivered therefrom.

8. In a dough molding machine, a rotatable table, a substantially annular former supported over the table, a series of rotatable cranks for imparting an eccentric oscillating movement to the former transversely to the axis of the table so that the rotation of the table and movement of the former will cause the dough to travel along the former and to be molded and delivered therefrom, and means for varying the relative rate of movement of the table and former.

9. In a dough molding machine, a rotatable table, a substantially annular former supported over the table, means for moving the former transversely to the axis of the table so that the rotation of the table and movement of the former will cause the dough to travel along the former and to be molded and delivered therefrom, means for varying the relative rate of movement of the table and former, an endless band for delivering the dough, and means for adjusting the position of the band relatively to the end of the former.

10. In a dough molding machine, a rotatable table, a substantially annular former supported over the table, means for imparting an oscillating movement to the former transversely to the axis of the table so that the rotation of the table and movement of the former will cause the dough to travel along the former and to be molded and delivered therefrom, means for varying the relative rate of movement of the table and former, an endless band for delivering the dough, and means for adjusting the position of the band relatively to the end of the former.

11. In a dough molding machine, a rotatable table, a substantially annular former supported over the table, means for imparting an eccentric oscillating movement to the former transversely to the axis of the table so that the rotation of the table and movement of the former will cause the dough to travel along the former and to be molded and delivered therefrom, means for varying the relative rate of movement of the table and former, an endless band for delivering the dough, and means for adjusting the position of the band relatively to the end of the former.

12. In a dough molding machine, a rotatable table, a substantially annular former supported over the table, a series of rotatable cranks for imparting an eccentric oscillating movement to the former transversely to the axis of the table so that the rotation of the table and movement of the former will cause the dough to travel along the former and to be molded and delivered therefrom, an endless band for delivering the dough and means for adjusting the position of the band relatively to the end of the former.

13. In a dough molding machine, a rotatable table, a substantially annular former supported over the table, the said former being larger and shallower at the inlet than at the delivery end, and means for moving the former transversely to the axis of the table so that the rotation of the table and movement of the former will cause the dough to travel along the former and to be molded and delivered therefrom.

14. In a dough molding machine, a rotatable table, a substantially annular former supported over the table, the said former being larger and shallower at the inlet than at the delivery end, and means for imparting an oscillating movement to the former transversely to the axis of the table so that the rotation of the table and movement of the former will cause the dough to travel along the former and to be molded and delivered therefrom.

15. In a dough molding machine, a rotatable table, a substantially annular former supported over the table, the said former being larger and shallower at the inlet than at the delivery end, and means for imparting an eccentric oscillating movement to the former transversely to the axis of the table so that the rotation of the table and movement of the former will cause the dough to travel along the former and to be molded and delivered therefrom.

16. In a dough molding machine, a rotatable table, a substantially annular former supported over the table, the said former being larger and shallower at the inlet than at the delivery end, and having an open top at the delivery end, and means for moving the former transversely to the axis of the table so that the rotation of the table and movement of the former will cause the dough to travel along the former and to be molded and delivered therefrom.

17. In a dough molding machine, a rotatable table, a substantially annular former supported over the table, the said former being larger and shallower at the inlet than at the delivery end, and having an open top at the delivery end, and means for imparting an oscillating movement to the former transversely to the axis of the table so that the rotation of the table and movement of the former will cause the dough to travel along the former and to be molded and delivered therefrom.

18. In a dough molding machine, a rotatable table, a substantially annular former supported over the table, the said former being larger and shallower at the inlet than at the delivery end, and having an open top at the delivery end, and means for imparting an eccentric oscillating movement to the former transversely to the axis of the table so that the rotation of the table and movement of the former will cause the dough to travel along the former and to be molded and delivered therefrom.

19. In a dough molding machine, a rotatable table, a substantially annular former supported over the table, a series of rotatable cranks for imparting an eccentric oscillating movement to the former transversely to the axis of the table so that the rotation of the table and movement of the former will cause the dough to travel along the former and to be molded and delivered therefrom, and variable speed driving gear between the table and the cranks.

20. In a dough molding machine, a table mounted on a vertical shaft, a frame having bearings in which the shaft is journalled, a series of cranks mounted in bearings in the frame around the table, a carrier supported over the table by arms engaging the cranks, a former detachably supported in the carrier so as to be interchangeable with other formers, means for driving the table and the cranks and means for varying the relative rate at which they rotate.

21. In a dough molding machine, a table mounted on a vertical shaft, a frame having bearings in which the shaft is journalled, a series of cranks mounted in bearings in the frame around the table, a carrier supported over the table by arms engaging the cranks, a former detachably supported in the carrier so as to be interchangeable with other formers, a main driving shaft mounted in transverse bearings in the frame, gearing between this main shaft and at least one of the cranks, a secondary transverse shaft driven by gearing from the main shaft, a friction wheel mounted upon and driven by the secondary shaft, a friction disc mounted on the vertical shaft carrying the table, and means for sliding the friction wheel along its shaft so as to vary the point of engagement with the friction disc.

22. In a dough molding machine, a table mounted on a vertical shaft, a frame having bearings in which the shaft is journalled, a series of cranks mounted in bearings in the frame around the table, a carrier supported over the table by arms engaging the cranks, a former detachably supported in the carrier so as to be interchangeable with other formers, means for driving the table and the cranks, means for varying the relative rate at which they rotate, an endless band mounted on pulleys over the table, and a radial arm on which one pulley is supported, and adapted to swing about the axis of the other pulley to vary the position of the band relatively to the delivery end of the former.

23. In a dough molding machine, a table mounted on a vertical shaft, a frame having bearings in which the shaft is journalled, a series of cranks mounted in bearings in the frame around the table, a carrier supported over the table by arms engaging the cranks, a former detachably supported in the carrier so as to be interchangeable with other formers, a main driving shaft mounted in transverse bearings in the frame, gearing between this main shaft and at least one of the cranks, a secondary transverse shaft driven by gearing from the main shaft, a friction wheel mounted upon and driven by the secondary shaft, a friction disc mounted on the vertical shaft carrying the table, means for sliding the friction wheel along its shaft so as to vary the point of engagement with the friction disc, an endless band mounted on pulleys over the table, a radial arm on which one pulley is supported and adapted to swing about the axis of the other pulley to vary the position of the band relatively to the delivery end of the former.

CHARLES DAWSON DILLEY.